United States Patent [19]

Senda et al.

[11] Patent Number: 4,464,422
[45] Date of Patent: Aug. 7, 1984

[54] PROCESS FOR PREVENTING OXIDATION OF COPPER FILM ON CERAMIC BODY

[75] Inventors: Atsuo Senda, Otsu; Suehiro Kato, Nagaokakyo; Toru Kasanami, Tsuzuki, all of Japan

[73] Assignee: Murata Manufacturing Co., Ltd., Kyoto, Japan

[21] Appl. No.: 440,302

[22] Filed: Nov. 9, 1982

[51] Int. Cl.$^3$ .............................................. B05D 5/12
[52] U.S. Cl. ............................... 427/124; 204/192 R; 204/192 N; 204/192 C; 422/7; 422/9; 427/81; 427/91; 427/99; 427/250; 427/255; 427/331
[58] Field of Search ................... 427/38, 39, 250, 91, 427/255, 99, 350, 404, 255.6, 124, 331, 383.5, 335, 336, 343; 204/192 R, 192 C, 192 N; 422/7, 9

[56] References Cited

U.S. PATENT DOCUMENTS

| | | | |
|---|---|---|---|
| 2,799,600 | 7/1957 | Scott | 427/38 |
| 3,227,581 | 1/1966 | Zumaquero | 427/124 |
| 3,697,342 | 10/1972 | Cuomo | 427/124 |
| 4,325,984 | 4/1982 | Galfo et al. | 427/38 |
| 4,327,131 | 4/1982 | Branovich | 427/377 |
| 4,351,695 | 9/1982 | Hieber et al. | 427/250 |

FOREIGN PATENT DOCUMENTS 54-20974  2/1979  Japan ........................... 427/255.6

Primary Examiner—Sadie L. Childs
Attorney, Agent, or Firm—Birch, Stewart, Kolasch & Birch

[57] ABSTRACT

A process for preventing the oxidation of a copper film formed on a ceramic body, which comprises the steps of forming a copper film on a ceramic body by a dry-plating process, treating the resultant copper film with a deactivating agent comprising at least one volatile hydrocarbon halide monomer by feeding the same into a vacuum chamber of a dry-plating apparatus.

12 Claims, No Drawings

PROCESS FOR PREVENTING OXIDATION OF COPPER FILM ON CERAMIC BODY

BACKGROUND OF THE INVENTION

1. Field of the Invention

The present invention relates to a process for preventing oxidation of a copper film on a ceramic body. More particularly, it relates to a process for preventing oxidation of a copper film that has been formed on a ceramic body as electrodes or conductive paths of electronic ceramic components.

2. Description of the Prior Art

There are known various electronic ceramic components comprising a ceramic body and electrodes or conductive paths formed on the ceramic body. In such components, for example, ceramic capacitors, the electrodes are generally made of silver, that is, a high conductive material. These electrodes are generally formed on a ceramic body by a process comprising the steps of applying silver paste to opposed surfaces of the ceramic body, and then baking it at an elevated temperature. However, the recent rising cost of silver has resulted in a considerable increase in the production cost of such ceramic capacitors. Some attempts have been made to solve this problem. For example, one attempt has been to apply a plating process such as electroless plating, sputtering, ion-plating and the like to a ceramic body to form conductive thin films on the ceramic body. Another one is to use a cheap conductive material as an electrode material instead of silver.

Under such a background, attempts have been made to use nickel as an electrode material and to apply electroless plating to form a conductive thin film on the ceramic body. The nickel films formed on the ceramic body enable the formation of inexpensive electrodes. However, they have the following disadvantages: (a) the use of nickel electrodes results in the deterioration of frequency characteristics at high frequencies as compared with the silver electrodes, since the specific resistance of nickel is $7.24 \times 10^{-6}$ $\Omega \cdot$cm larger than that of silver ($1.62 \times 10^{-6}$ $\Omega \cdot$cm). (b) The nickel plated electrode is poor in solderability. An attempt has been made to decrease the resistance of the nickel electrode by forming a solder layer on the entire surface of the electrode. However, this has ended in failure because it requires the use of a large amount of a flux with high activity, and also requires the removal of excess flux after soldering. In addition, there is the fear cracking of the ceramic body since the soldering is carried out by immersing the ceramic body in a hot soldering bath.

For the reasons mentioned above, other attempts have been made to develop inexpensive electrodes with high conductivity. To that end, it has been proposed to use copper as an electrode material and to metallize the ceramic body by the dry-plating process such as vacuum deposition, sputtering and ion plating. However, the copper film formed by the dry process has a serious disadvantage in that it is very oxidizable. The copper film thus becomes poor in conductivity and in solderability when leaving it exposed to air. Thus, it is difficult to use copper films formed by dry-plating process as electrodes or as paths for electronic ceramic components.

It is therefore an object of the present invention to provide a process for preventing oxidation of copper films on ceramic bodies.

Another object of the present invention is to provide a process for producing copper-plated ceramic products for electronic ceramic components that possess high reliability.

Still another object of the present invention is to provide a process for producing copper-plated ceramic products for electronic ceramic components that can be preserved for a long period of time without deterioration of the conductivity and solderability of the copper film.

According to the present invention, there is provided a process for preventing oxidation of copper films formed on ceramic bodies, comprising the steps of forming a copper film on a ceramic body in a vacuum chamber of a dry-plating apparatus, and treating the resultant copper film on the ceramic body with an deactivating agent comprising at least one volatile hydrocarbon halide monomer by introducing the same into the vacuum chamber.

According to the present invention, it is possible to produce copper-plated ceramic products for electronic ceramic components comprising a ceramic body and a copper film formed thereon with high conductivity and good solderability because the copper film is protected from oxidation by the presence of a volatile hydrocarbon halide monomer.

According to the present invention, it is unnecessary to cool the copper film at a high speed since no oxidation occurs even when the copper film is allowed to stand in natural atmosphere at a temperature at which the oxidation of copper film occurs. Also, the copper film treated with volatile hydrocarbon halide monomer is never oxidized even if it is taken out of the vacuum chamber at an elevated temperature. There is no need to cool the film after the plating, thus making it possible to reduce the time required for the formation of copper film on the ceramic body.

As the dry-plating apparatus, there may be used those such as a vacuum deposition apparatus, a sputtering apparatus and an ion-plating apparatus. When producing copper-plated ceramic products, a ceramic body is arranged in a vacuum chamber of the apparatus, plated with copper, and then treated with the deactivating agent comprising at least one volatile hydrocarbon halide monomer. The monomer may be supplied in a gaseous form or spray form into the chamber. The monomer introduced into the vacuum chamber comes into contact with the copper film formed on the ceramic body, and the copper film loses its catalytic activity due to the influence of the volatile hydrocarbon halide monomer that acts as a catalyst poison. The deactivating agent comprising a volatile hydrocarbon halide monomer may be introduced into the vacuum chamber together with the surrounding atmosphere that is supplied for increasing the pressure in the chamber to atmospheric pressure. In short, the contact between volatile hydrocarbon halide monomer and the copper film suffices for the prevention of oxidation. Preferably, the copper film should be brought into contact with the deactivating agent as soon as possible to prevent the oxidation.

In one preferred embodiment, the deactivating agent is composed of at least one volatile hydrocarbon halide monomer selected from the group consisting of trichloroethylene, tetrachloroethylene, chlorofluorocarbons (trichlorofluoromethane, dichlorodifluoromethane, chlorodifluoromethane, 1,1,2-trichloro-1,2,2-trifluoroethane), carbon tetrachloride, methylchloride, methylenechloride, and chlorobenzene.

According to the present invention copper-plated ceramic products for electronic ceramic components may be produced by preparing a ceramic body in the known manner, forming a copper film on the surface of the ceramic body by the dry-plating process such as a vacuum deposition, sputtering, a ion-plating and the like, and treating the the resultant thin copper film on the ceramic body with the deactivating agent comprising at least one volatile hydrocarbon halide monomer, before exposing the ceramic product to the atmosphere. The resultant copper-plated ceramic products may be made into various electronic ceramic components. For example, ceramic capacitors may be produced by using shaped dielectric ceramics, forming a copper film on the whole surface of the ceramics, treating the resultant ceramic product with a deactivating agent comprising at least one volatile hydrocarbon halide monomer, and then removing the copper film formed on the edge face of the ceramics to form opposed electrodes insulated from one another. Also, printed-wiring boards may be produced by preparing a ceramic plate such as of alumina, zirconia, or forsterite ceramics, forming a copper film on one surface of the plate, treating the copper-plated ceramic plate with a deactivating agent, and etching the copper film to form copper circuit patterns. Other various electronic ceramic components may be produced by preparing shaped bodies of ceramic resistors, ceramic semiconductors and the like, forming a copper film on the ceramic body, and treating the resultant copper-plated ceramic body with a deactivating agent comprising at least one volatile hydrocarbon halide monomer.

The invention will be further apparent from the following description with reference to the preferred examples of the present invention.

EXAMPLE 1

There were prepared boundary layer type semiconductor ceramic discs of a strontium titanate system having a diameter of 10.0 mm and a thickness of 0.3 mm. The ceramic discs and metal copper were respectively mounted on an anode and a cathode of a DC bipolar sputtering apparatus. After making it airtight, the vacuum chamber of the sputtering apparatus was evacuated to a pressure of about $10^{-6}$ Torr, and then supplied with argon gas, while adjusting the pressure to about $5 \times 10^{-2}$ to $4 \times 10^{-4}$ Torr, for example, $3 \times 10^{-3}$ Torr. A DC voltage was applied between the anode and the cathode so as to supply an electric power of 6 W/cm$^2$ to the ceramic disc mounted on the anode to form a copper film. After a copper film had been formed on the ceramic disc, 1 cm$^3$ of trichlorofluoromethane was supplied to the vacuum chamber through a gas inlet to make contact with the copper film.

The resultant ceramic product was allowed to stand for 1 month in a natural atmosphere to investigate the oxidation resistance of the copper film. The copper film of the ceramic product remained unaltered and possessed good solderability.

EXAMPLE 2

There were prepared dielectric ceramic discs of a titanium dioxide system having a diameter of 6.5 mm and a thickness of 0.5 mm. The ceramic disc was arranged in a vacuum chamber of a vacuum metallizing apparatus. After being made airtighten, the vacuum chamber of the apparatus was evacuated through its vent to a pressure of about $5 \times 10^{-5}$ to $5 \times 10^{-6}$ Torr. The copper arranged in the vacuum chamber was evaporated by a heater to deposit copper on the surface of the ceramic body. After the vacuum deposition, the resultant ceramic product was treated with carbontetrachloride by spraying the same into the vacuum chamber through a valve arranged in the vent. Air was then introduced into the vacuum chamber.

The thus obtained ceramic product was allowed to stand for 24 hour in a natural atmosphere to investigate the oxidation resistance of the copper film. The copper film remained unaltered in its color and possessed good solderability.

COMPARATIVE EXAMPLE 1

The ceramic disc was metallized in the same manner as in Example 2, and then taken out from the vacuum chamber without treating it with the spray of carbontetrachloride. The resultant ceramic product was allowed to stand for 24 hours in a natural atmosphere. The copper film on the ceramic disc showed a color change towards brown and was poor in solderability.

EXAMPLE 3

There were prepared dielectric ceramic discs of titanium dioxide system having a diameter of 6.5 mm and a thickness of 0.5 mm. Using the process of Example 2, a copper film was formed on the ceramic disc in the same manner as in Example 2, and then treated with 1 cm$^3$ of trichloroethylene by feeding the same in a gas form into the vacuum chamber through the vent. The resultant ceramic product was taken out of the vacuum chamber.

The ceramic product was allowed to stand for 24 hours in a natural atmosphere to investigate the oxidation resistance of its copper film. The copper film remained unaltered in color and possessed good solderability.

COMPARATIVE EXAMPLE 2

A copper film was formed on the ceramic disc prepared in Example 3, and it was then taken out of the vacuum chamber without treating it with trichloroethylene. The thus metallized ceramic disc was allowed to stand for 24 hours in a natural atmosphere. The copper film on the ceramic disc showed a color change towards brown and was poor in solderability.

EXAMPLE 4

There were prepared boundary layer semiconductor ceramic discs of a strontium titanate system having a diameter of 10.0 mm and a thickness of 0.3 mm. The ceramic disc was mounted on a cathode of an ion-plating apparatus, whereas a copper source was mounted on the anode. After making it airtight, the vacuum chamber of the apparatus was evacuated to a pressure of about $10^{-6}$ Torr, and then supplied with argon gas to adjust the pressure to about $10^{-1}$ to $10^{-4}$ Torr. A glow discharge was generated by applying a high DC voltage between the anode and the cathode and developing a plasma. The copper was evaporated by heating the same to carry out ion-plating. After the ion-plating, the ceramic disc was treated with trichlorofluoromethane by spraying the same into the vacuum chamber through the vent. Then the metallized ceramic disc was taken out of the vacuum chamber.

The metallized ceramic disc was allowed to stand for a long time under the conditions of a relative humidity of 95% and a temperature of 40° C. to investigate the oxidation resistance of the copper film. The copper film remained unaltered in color and possessed good solderability.

As will be understood from the above, the process according to the present invention makes it possible to produce copper-plated ceramic products with high resistance to oxidation. According to the present invention the antioxidation treatment of the copper-plated ceramic products follows the formation of the copper film on the ceramic body, thus making it possible to carry out the treatment in the vacuum chamber used for the formation of the film.

What we claim is:

1. A process for preventing oxidation of a copper film which has been formed on a ceramic body by a dry-plating process, which comprises contacting said copper film with a deactivating agent comprising at least one volatile hydrocarbon halide monomer in an evacuated vacuum chamber of the dry-plating apparatus before exposing the copper film on the ceramic body to the atmosphere.

2. The process according to claim 1 wherein said copper film is contacted with the deactivating agent by feeding the deactivating agent in a gaseous form into said chamber.

3. The process according to claim 1 wherein said copper film is contacted with the deactivating agent by spraying the deactivating agent into the chamber.

4. The process according to claim 1 wherein the copper film is contacted with the deactivating agent by feeding the deactivating agent into the chamber simultaneously with the surrounding atmosphere that is supplied for increasing the pressure in the chamber.

5. The process according to claim 1 wherein the deactivating agent is at least one volatile hydrocarbon halide monomer selected from the group consisting of trichloroethylene, tetrachloroethylene, trichlorofluoromethane, dichlorodifluoromethane, chlorodifluoromethane, 1,1,2-trichloro-1,2,2-trifluoroethane, carbon tetrachloride, methylchloride, methylene chloride, and chlorobenzene.

6. A process for producing copper-plated ceramic products for electronic ceramic components comprising the steps of forming a copper film on a ceramic body in an evacuated vacuum chamber by a dry-plating process, containing the resultant copper-plated ceramic body with a deactivating agent consisting essentially of at least one volatile hydrocarbon halide monomer to allow the copper to lose its catalytic activity before exposing said copper-plated caramic body to the atmosphere.

7. The process according to claim 6 wherein said copper film is formed by the vapor deposition of copper.

8. The process according to claim 6 wherein said copper film is formed by the sputtering of copper.

9. The process according to claim 6 wherein said copper film is formed by ion-plating.

10. The process according to claim 6 wherein said copper-plated ceramic body is contacted with the deactivating agent by introducing said agent in gaseous form into said chamber.

11. The process according to claim 6 wherein said copper-plated ceramic body is contacted with the deactivating agent by spraying the deactivating agent into said chamber.

12. The process according to claim 6 wherein the deactivating agent is at least one volatile hydrocarbon halide monomer selected from the group consisting of trichloroethylene, tetrachloroethylene, trichlorofluoromethane, dichlorodifluoromethane, chlorodifluoromethane, 1,1,2-trichloro-1,2,2-trifluoroethane, carbon tetrachloride, methylchloride, methylenechloride, and chlorobenzene.

* * * * *